United States Patent [19]

Wilson, Jr. et al.

[11] Patent Number: 4,755,930
[45] Date of Patent: Jul. 5, 1988

[54] HIERARCHICAL CACHE MEMORY SYSTEM AND METHOD

[75] Inventors: Andrew W. Wilson, Jr., Pittsburgh, Pa.; Steven J. Frank, Southboro, Mass.

[73] Assignee: Encore Computer Corporation, Marlboro, Mass.

[21] Appl. No.: 749,581

[22] Filed: Jun. 27, 1985

[51] Int. Cl.⁴ .................... G06F 12/08; G06F 12/12
[52] U.S. Cl. .................................................. 364/200
[58] Field of Search ... 364/200 MS File, 900 MS File, 364/134; 365/189, 230

[56] References Cited

U.S. PATENT DOCUMENTS

| | | | |
|---|---|---|---|
| 4,136,386 | 1/1979 | Annunziata et al. | 364/200 |
| 4,141,067 | 2/1979 | McLagan | 364/200 |
| 4,144,566 | 3/1979 | Timsit | 364/200 |
| 4,157,586 | 6/1979 | Gannon et al. | 364/200 |
| 4,161,024 | 7/1979 | Joyce et al. | 364/200 |
| 4,228,503 | 10/1980 | Waite et al. | 364/200 |
| 4,322,795 | 3/1982 | Lange et al. | 364/200 |
| 4,442,487 | 4/1984 | Fletcher et al. | 364/200 |
| 4,445,174 | 4/1984 | Fletcher | 364/200 |
| 4,464,712 | 8/1984 | Fletcher | 364/200 |
| 4,464,717 | 8/1984 | Keeley et al. | 364/200 |
| 4,489,381 | 12/1984 | Lavallee et al. | 364/200 |
| 4,530,055 | 7/1985 | Hamstra et al. | 364/200 |
| 4,577,293 | 3/1986 | Matick et al. | 365/189 |

FOREIGN PATENT DOCUMENTS

| | | |
|---|---|---|
| 0032956 | 7/1980 | European Pat. Off. |
| 0062165 | 10/1982 | European Pat. Off. |
| 0083400 | 10/1982 | European Pat. Off. |

OTHER PUBLICATIONS

Bell, J.; Cassassent, D.; and Bell, C. G.; "An Investigation of Alternate Cache Organization" *IEEE Transactions on Computing*, Apr., 1974.

Chow, C. K.; "Determination of Cache's Capacity and its Maturing Storage Hierarchy", *IEEE Transactions on Computers* (C-25), Feb., 1976.

Dubois, Michael, and Briggs, F. A.; "Effects of Cache Coherency in Multiprocessors"; *IEEE Transactions on Computers* C-31(11), Nov., 1982.

Easton, M. C.; "Computation of Cold-Start Miss Rations" *IEEE Transactions on Computers* C-27 (5), May, 1978.

Frank, S. J.; "A Tightly Coupled Multiprocessor System Speeds Memory-Access Timer"; *Electronics:* 164–169, Jan., 1984.

Goodman, J. R.; "Using Cache Memory to Reduce Processor-Memory Traffic", in 10th Annual Symposium on Computer Architecture, 1983.

Papamarcos, M. S., and Patel, J. M.; "A Low Overhead Coherence Solution for Multiprocessors with Private Cache Memories" in 11th Annual Symposium Computer Architecture, 1984.

Patel, J. H.; "Analysis of Multiprocessors with Private Cache Memories" *IEEE Transactions on Computers,* C-31(4): 296–304, Apr., 1982.

Pohm, A. V., and Agrawal, O. P.; *High-Speed Memory Systems* Reston Publishing Company, Inc., 1983.

(List continued on next page.)

Primary Examiner—Gary V. Harkcom
Assistant Examiner—Randy W. Lacasse
Attorney, Agent, or Firm—Henry D. Pahl, Jr.

[57] ABSTRACT

A caching system for a shared bus multiprocessor which includes several processors each having its own private cache memory. Each private cache is connected to a first bus to which a second, higher level cache memory is also connected. The second, higher level cache in turn is connected either to another bus and higher level cache memory or to main system memory through a global bus. Each higher level cache includes enough memory space so as to enable the higher level cache to have a copy of every memory location in the caches on the level immediately below it. In turn, main memory includes enough space for a copy of each memory location of the highest level of cache memories. The caching can be used with either write-through or write-deferred cache coherency management schemes.

14 Claims, 5 Drawing Sheets

OTHER PUBLICATIONS

Rao, G. S.; "Performance Analysis of Cache Memories"; *Journal of the ACM* 25, 1978.

Rudolph, L. and Segall, Z.; "Dynamic Decentralized Cache Scheme for MINK Parallel Processors"; in 11th Annual Symposium on Computer Architecture, 1984.

Smith, A. J.; "A Comparative Study of Set Associative Memory Mapping Algorithm and Their Use for Cache and Main Memory", *IEEE Transactions on Software Engineering* SE-4(5), Mar., 1978.

Smith, A. J.; "Cache Memories", *Computing Surveys*, 14(3), Sep. 1982.

Smith, J. E., Goodman, J. R.; "A Study of Instruction Cache Organizations and Replacement Policies", In 10th Annual Symposium on Computer Architecture, 1983.

Strecker, W. D.; "Transient Behavior of Cache Memories", *ACM Transactions on Computer Systems* (4), Nov., 1983.

Tang, C. K.; "Cache System Design in the Tightly Coupled Multiprocessor System", in AFIPS *Proceedings.* 1976.

Wulf, W. A., Levin, R., and Harbison, S. P.; *Hydra/C.mmp An Experimental Computer System;* McGraw-Hill Book Company, 1981.

Censier, L. M., and Feautrier, P.; "A New Solution to Coherence Problems in Multicache Systems", *IEEE Transactions on Computers*, vol. c-27, No. 12, Dec., 1978.

Yen, W. C., and Fu, K. S.; "Analysis of Multiprocessor Cache Organizations with Main Memory Update Policies", *IEEE*, 1981, pp. 89-105.

KEY
PURGE - REMOVAL OF CACHED COPY DUE TO CACHE REPLACEMENT
PROCESSOR READ - READ REQUEST FROM PROCESSOR ASSOCIATED WITH THIS CACHE
PROCESSOR WRITE - WRITE REQUEST FROM PROCESSOR ASSOCIATED WITH THIS CACHE
BUS READ - READ REQUEST ON BUS
BUS WRITE - WRITE REQUEST ON BUS

KEY
PURGE - REMOVAL OF CACHED COPY DUE TO CACHE REPLACEMENT
PROCESSOR READ - READ REQUEST FROM PROCESSOR ASSOCIATED WITH THIS CACHE
PROCESSOR WRITE - WRITE REQUEST FROM PROCESSOR ASSOCIATED WITH THIS CACHE
BUS READ - READ REQUEST ON ROAD
BUS WRITE - WRITE REQUEST ON BUS
FLUSH WRITE - SPECIAL WRITE TO MAIN MEMORY WHOSE DATA IS ALSO SENT TO BUS READ REQUEST ISSUE

FIG. 3

L2BR: CLUSTER BUS READ
L1BW: CLUSTER BUS WRITE
L1BI: CLUSTER BUS INVALIDATE
L1BI: CLUSTER BUS FLUSH

L2: GLOBAL BUS READ
L2: GLOBAL BUS WRITE
PURGE: REPLACEMENT OF CACHE
  LOCATION BY DIFFERENT
  MEMORY LOCATION

Po : PORT 0
PI : PORT I
BR : RECEIVED BUS READ
BW : RECEIVED BUS WRITE

GENBI : GENERATED BUS INVALIDATE
GENBF : GENERATED BUSH FLUSH

HIERARCHICAL CACHE MEMORY SYSTEM AND METHOD

BACKGROUND OF THE INVENTION

The present invention relates to cache memory systems and more particularly to a hierarchical caching system suitable for use with shared bus multiprocessors.

Over the past few years, many methods have been developed to interconnect the processors and memory units of a tightly coupled multiprocessor system. One such solution has been to organize one group of processors on one side of the system and a group of memories on the other side of the system with a central switching network connecting the processors to the memories. Shared address space machines have also been built or proposed which distribute the memories among the processors using a hierarchical network for interconnection. Since the switching networks impose added delay, and main memory is often not fast enough to keep up with the processors, it becomes necessary to add private caches to each of the processors to allow them to run at full speed. The addition of such private caches raises cache coherency issues, which for a general switching network, are very difficult to resolve. In fact, the systems proposed to date to maintain coherency often become the system bottlenecks.

Another method of interconnecting a group of processors of a multiprocessor system is connection through a shared bus. Since all traffic between the caches and main memory travels on the shared bus, each cache can ensure that it contains only current copies of main memory locations by monitoring the bus for transfers which might result in memory location obsolesence. While shared buses have often been faulted for inadequate bandwidth, the use of large private caches drastically reduces the required bandwidth while providing the processors with short effective access times. In addition, the extra bus traffic generated by the coherence algorithms is negligible so the full bandwidth of the bus is available to handle real data. As with uniprocessors, the private caches may be of either the write-through or write-deferred type, with corresponding write-through or write-deferred coherency schemes. Because bus bandwidth is the principal limiting factor in expansion of these systems, write-deferred schemes are generally preferred, but the write-through schemes are simpler to implement.

Coherency problems between several private caches in a multiprocessor system develop when several private caches have copies of the contents of a particular memory location. Obviously, it is essential that these copies be identical. If a processor modifies a copy of the memory location in its cache, that modification must either migrate to main memory or to all of the other private caches having a copy of that location. In the alternative, all of the other caches can be invalidated. In practice, the invalidation method is usually required as it eliminates a number of race conditions which can develop if updating of copies of the memory location in the other caches is attempted. With non-shared bus switching schemes, traffic due to invalidation messages can become quite large. Shared buses, however, can provide these messages implicitly.

Figure 1:
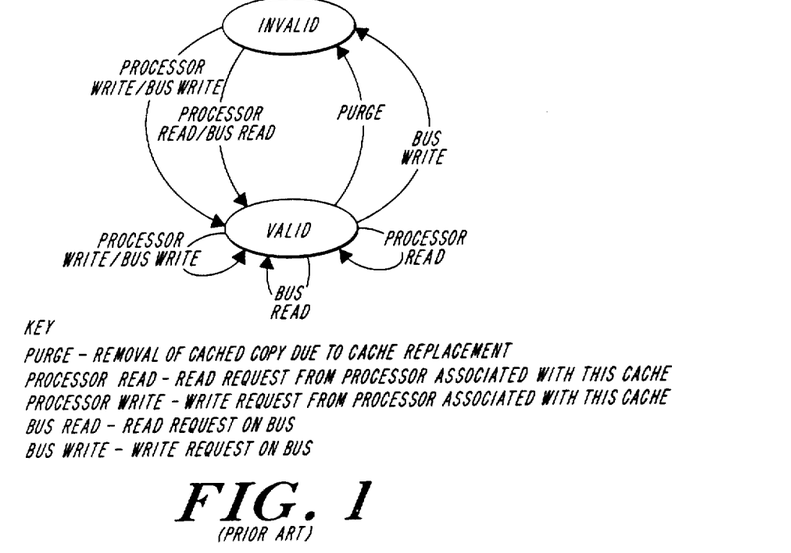
FIG. 1 is a state diagram for a cache location in a write-through cache based multiprocessor.

With a write-through caching scheme, each time a private cache's copy of a location is written to by its processor, that write is passed on to the main memory over the shared bus. As indicated in the state diagram for a cache location in the write-through cache based multiprocessor of FIG. 1, all other caches in the system will be monitoring the shared bus for writes, and if any other caches contain a copy of the memory location, they will invalidate that copy. If none of the other caches ever actually use that location again, then the coherency scheme produces no additional bus traffic. If one or more of the processors request that location at a later time, extra main memory reads will result. Simulation experiments have shown that these extra reads are infrequent and contribute very little to extra bus traffic. Because the caches are write-through, the amount of traffic on the bus will never be less than the sum of all the processor generate memory writes, which typically comprise 15%-20% of memory requests. Write-through caching is highly effective where limited parallelism (on the order of 20 medium speed processors) is required and is simple to implement.

Write-deferred caching schemes have been successfully utilized by uniprocessor designers who have found that write-deferred caches significantly reduce the amount of main memory traffic from that of write-through caches. In theory, as the cache size approaches infinity, the memory traffic approaches zero. Current practical cache sizes enable reduced bus traffic in a multiprocessor system utilizing write-deferred caching of up to an order of magnitude over write-through caches, thereby potentially adding an order of magnitude or more processors to a shared bus multiprocessor system. The necessity of coherency maintainence complicates the situation, and several additions to the basic write-deferred scheme are usually required. A more complicated system with higher bus utilization rates than a pure write-deferred system results, but still much lower utilization per processor than with a write-through scheme is achieved.

Several variations of shared bus oriented write-deferred caching systems exist which maintain cache coherency. In "Using Cache Memory to Reduce Processor Memory Traffic" (10th International Symposium on Computer Architecture) by Dr. James R. Goodman, a caching system (hereinafter the "Goodman system") is described which utilizes an initial write-through mode for recently aquired data to invalidate other caches in the event of a local modification to the data. As shown in the state diagram of FIG. 2, in the Goodman system, when a main memory location is initially accessed it enters the cache in either the valid state (if a read) or a reserved state (if a write). A location already in the valid state will enter the reserved state if a processor write access occurs. The write which caused the transition into the reserved state will be passed through the cache and onto the shared bus. Subsequent processor writes to that location will place it in a special state indicating that the cache it is in has the only correct copy of the location. This state is referred to as a "dirty" state.

Figure 2:
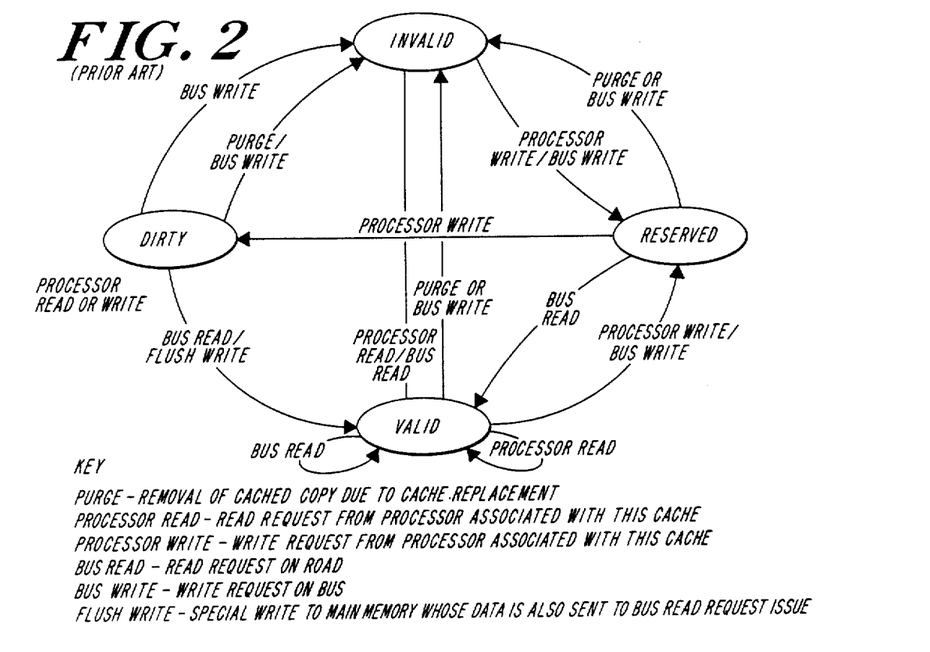
FIG. 2 is a state diagram for a cache location in a write-deferred cache based multiprocessor.

As in the case of write-through caching, all caches in the Goodman system monitor the bus for writes which affect their own data and invalidate it when such a write is seen. Thus, after sending the initial write-through, a cache is guaranteed to have the only copy of a memory location, and can write at will to it without sending further writes to the shared bus. However, the cache must monitor the shared bus for any reads to memory locations whose copies it has been modifying, for after such a read, it will no longer have an exclusive copy of that location. If only the initial write-through write has occurred, then the only action necessary is for the cache which had done the write to forget that it had an exclusive copy of the memory location. If two or more writes have been performed by the cache's associated processor, then it will have the only correct copy and must therefore update main memory before main memory responds to the read request of the other caches.

There are several known systems for updating main memory before main memory responds to the read request of the other caches which ensure that the read request which triggered that update receives the most recent copy of the memory location. These systems generally require the cache containing the modified copy to prevent the memory unit from completing the read transaction until the modified copy has been returned. Another possibility is to issue a special bus request which supercedes the reply from memory. The Goodman system can also be modified to avoid the initial write-through if it is known when the data is first accessed that no other copies exist. There are some race conditions involving simultaneous modification of non-overlapping subpieces of a block by different processors and implementation of read-modify-write locks, but these are solvable with careful design.

Another known system which avoids the problem of sneaking back dirty data to main memory adds a "checked out" bit to each block in main memory. When a private cache discovers it needs exclusive access to a location, it reads the location from main memory with an exclusive access read which sets the checked out bit and transfers ownership of the location to the private cache. Other caches which have copies of the data will invalidate those copies upon sensing the exclusive read on the bus. Thus, the scheme substitutes a second, special read for the initial write-through of the Goodman system. While this scheme avoids the need for the initial write-through, the total amount of traffic provided to the bus by this scheme is comparable to that of the Goodman system. This scheme does provide straight forward solutions to the read-modify-write lock problems mentioned above.

In spite of the increased complexity, any of the write-deferred schemes outlined above will generally be preferrable to use of write-through caches. The bus traffic reduction provided by write-deferred caches makes such caches highly desirable for a multiprocessor shared bus system, even though bus saturation still limits the size of these computers.

It is therefore a principal object of the present invention to provide a caching system for a shared bus multiprocessor with multiple hierarchically organized shared buses which reliably maintains cache coherency.

Another object of the present invention is to provide a caching system which allows the partitioning of a multiprocessor into a plurality of multiprocessors utilizing multiple hierarchically organized shared buses.

A further object of the present invention is to provide a caching system for a multiprocessor with multiple hierarchically organized shared buses which requires a minimum use of the shared bus.

Yet another object of the present invention is to provide a caching system for a multiprocessor with multiple hierarchically organized shared buses which can utilize write-through or write-deferred caches.

SUMMARY OF THE INVENTION

A caching system for a shared bus muiltiprocessor includes several processors each having its own private cache memory. Each private cache is connected to a first bus to which a second, higher level cache memory is also connected. The second, higher level cache in turn is connected either to another bus and higher level cache memory or to main system memory through a global bus. Each higher level cache includes enough memory space so as to enable the higher level cache to have a copy of every memory location in the caches on the level immediately below it. In turn, main memory includes enough space for a copy of each memory location of the highest level of cache memories. The caching system of the present invention can be used with either write-through or write-deferred cache coherency management schemes. Multi-port memories may also substitute for the main memory.

These and other objects and features of the present invention will be more fully understood from the following detailed description which should read in light of the accompanying drawings in which corresponding reference numerals refer to corresponding parts throughout the several views.

DETAILED DESCRIPTION OF THE PREFERRED EMBODIMENTS

Figure 3:
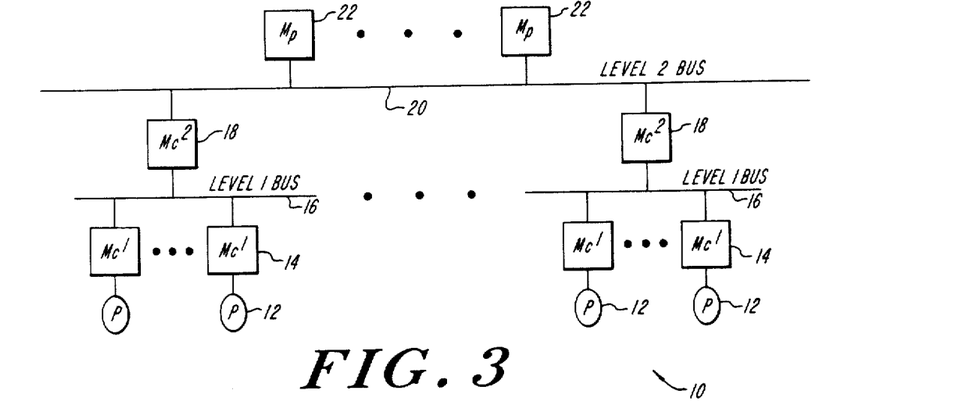
FIG. 3 is a diagramatic view of a hierarchical multiprocessor including two levels of caches and shared buses.

A simplified embodiment of the caching system for a shared bus multiprocessor 10 of the present invention, shown in FIG. 3, includes a plurality of cache memories arranged in a hierarchical fashion. By hierarchical, it is meant that cache memories are positioned at different levels relative to each other, with one or more lower level caches being connected to a higher level cache through a shared bus. Such higher level caches may also be connected, along with one or more other caches of the same level, to either main memory or to a cache of still another higher level.

In the embodiment including two levels of caches and shared buses shown in FIG. 3, each processor 12 has an associated cache memory 14, and each of the cache memories 14 is connected to a first shared bus 16. Bus 16 is also connected to a second, higher level cache 18 which in turn is connected to a second, higher level bus 20 shared among all of the other caches 18 of the second, higher level. Bus 20 connects main memory modules 22 to the second higher level cache 18. FIG. 3 therefore shows a hierarchical caching system in which a private cache-shared bus system is recursively applied to additional levels of caching. In the resulting tree structure, the higher level caches provide the links with the lower branches of the tree. The higher level caches, such as caches 18, act as filters, thereby reducing the amount of traffic passed to the upper levels of the tree. These higher level caches also extend the coherency control between levels, allowing system wide addressability.

Since most of the processor speed-up is achieved by the bottom level caches 14, the higher level caches 18 can be implemented with slower, denser, dynamic random access memories (DRAMs) identical to those used by the main memory modules 22. Average latency will still be reduced, since higher level switching delays will be avoided on hits (i.e. a memory access request for a location stored in the processor's cache). To gain maximum benefit from these caches, they need to be large, an order of magnitude larger than the sum of all the next lower level caches which feed into them. Since such caches can be DRAMs, this will not be a problem.

Figure 4:
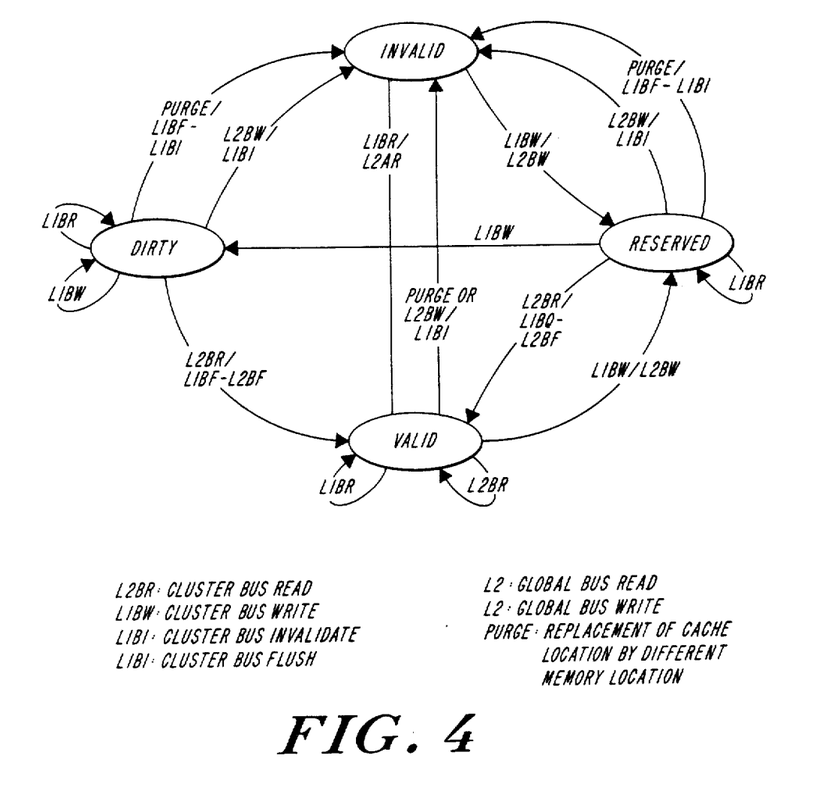
FIG. 4 is a state diagram for a level two cache using a multicache coherency algorithm according to the present invention.

The second and higher level caches (18 in the embodiment of FIG. 3) in the hierarchical system require some extensions to maintain system wide multicache coherency. The most important extension is the provision that any memory location for which there are copies in the lower level caches will also have copies in the higher level cache. As shown in the state diagram of FIG. 4, the system accomplishes this by generating an "invalidate" signal to lower level caches whenever a location is removed from the higher level cache. Because all copies of memory locations contained in the lower level caches are also found in the higher level cache, the higher level cache can serve as a multicache coherency monitor for all of the lower level caches connected to it.

The write-deferred caching scheme which is utilized in the present invention is similar to the Goodman system insofar as each cache location will have four states in both systems. The higher level caches of the present invention will, however, send invalidation of flush requests to the lower level caches when necessary to maintain multi-cache coherency. An invalidation request is treated similarly to a bus write by the lower level cache, and a flush request is treated similarly to a bus read.

Figure 5:
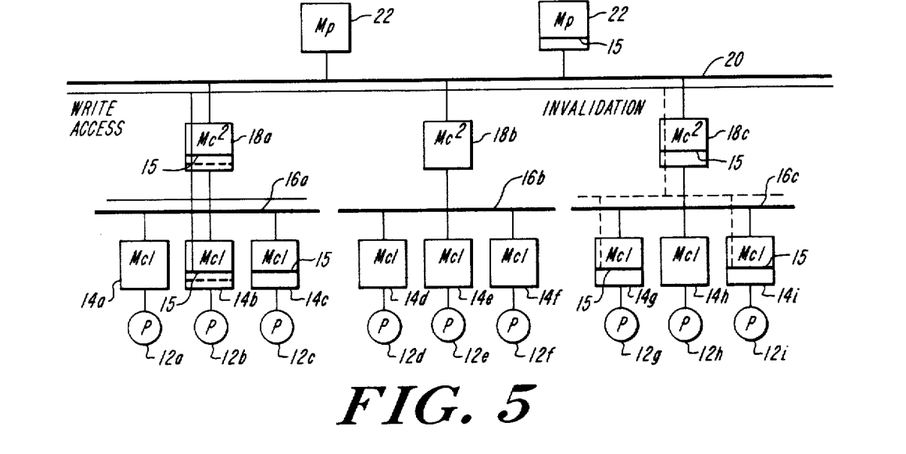
FIG. 5 is a diagramatic view showing an expanded embodiment of the multiprocessor system shown in FIG. 1, incorporating a write-through caching scheme.

Multi-cache coherency control may be achieved in a hierarchical shared bus multiprocessor of the present invention using either write-through caches or write-deferred caches. In the multicache system utilizing write-through caching of FIG. 5, when a processor 12 issues a write to memory, the write access filters up through the hierarchy of caches, appearing at each level on its associated shared bus. For example, a write from processor 12b filters from cache 14b to bus 16a, to cache 18a and finally onto the bus 20. (In the example, the horizontal line 15 in various memory units represents a common memory location.) For those portions of the system to which cache 14b is directly connected, the invalidation proceeds just as described above for a single level case. In addition, each cache having a copy of the affected memory location 15 (such as cache 14c) will simply invalidate that location. For those caches at higher levels of the hierarchy, the existence of a particular memory location implies that there may be copies of that location saved at levels directly underneath the cache. For example, when second level cache 18c in FIG. 5 detects the write access on bus 20, it must not only invalidate its own cache, but an invalidation request must be sent to lower level caches connected to it which contain that memory location. In the example of FIG. 5, invalidation signals are sent to caches 14g, 14i. To accomplish the invalidation, an invalidate request is placed on bus 16c which is interpreted by caches 14g, 14h, 14i as a write transaction for that memory location. These caches then invalidate their own copies, if they exist, just as though the invalidate request was a write from some other cache on their shared bus. Such a system assumes that any copies of memory locations which exist at the lower levels also exist in the associated caches at the higher levels. In order to guarantee this, it is necessary to send invalidate requests to lower level caches any time a location at a higher level is replaced due to a miss. Thus, it is important to maintain low miss ratios in the upper level caches, and to do so, such caches must be large.

In a hierarchical caching system of the present invention utilizing write-deferred caches, the invalidation operation is very similar to that utilized with write-through systems. With a write-deferred hierarchical caching system, the write-through of the Goodman system or the exclusive access read utilizing the extra bit in main memory of the other systems serves to initiate invalidations in the same way as writes in an all write-through cache. In particular, in the embodiment of the present invention utilizing a Goodman type write-deferred hierarchical caching system, the initial write-through is used to invalidate locations in other caches. In the embodiment utilizing the exclusive access read and extra bit, the exclusive access read not only invalidates the other caches, but it also sets a bit in main memory indicating that a private copy of the memory location exists in some cache.

Problems, however, arise after the initial invalidation when other processors request renewed access to the data. As with the single level caching schemes all caches must monitor their shared buses for read requests from other caches and make appropriate state changes if requests for locations for which they have exclusive copies are made. On a subsequent read from another private cache in the embodiment utilizing a Goodman type caching scheme, the cache with the valid copy will signal main memory 24 not to respond and will substitute its own copy of the location. On a subsequent read from another processor in the exclusive access read embodiment, the set bit in main memory 24 will inhibit main memory from responding and the cache with the valid copy of the memory location will respond instead. In addition, if the state of a cache indicates that there might be a dirty copy of a memory location in a cache beneath it in the hierarchy, then it must send a "flush" request down to it. These flush requests must propogate down to lower levels of the heirarchy and cause the lower level caches to modify their state to a "valid" state, just as though an actual read for that location had been seen on their shared buses.

Figure 6:
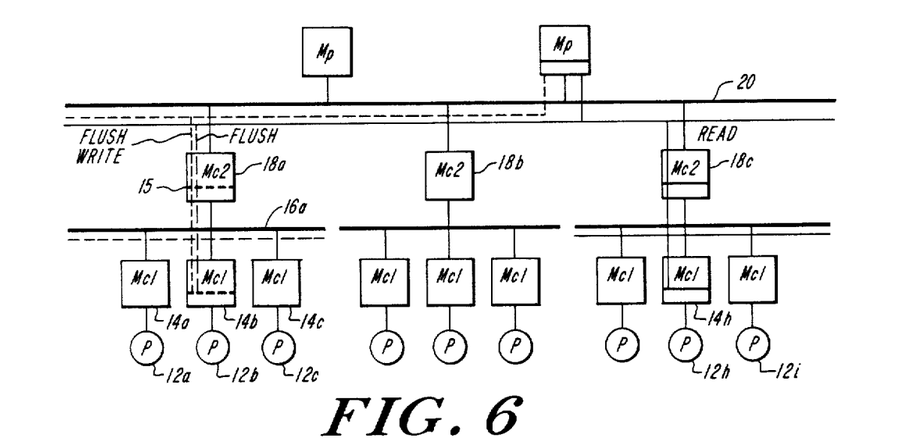
FIG. 6 is a diagramatic view showing another alternate embodiment of the multiprocessor system shown in FIG. 1, utilizing the hierarchical cache system utilizing a write-deferred caching scheme.

FIG. 6 illustrates a typical case utilizing a hierarchical write-deferred cache system. In FIG. 6, assuming that caches 14b and 18a have exclusive access to a location 15 as a result of the write sequence from a previous write, and processor 12h now wishes to read that location, the request will propogate up through the hierarchy (i.e. there will be no copies in any caches directly above processor 12h) so the request will "miss" at each level. When the request reaches bus 20, cache 18a will detect the need for relinquishing exclusive access and possibly flushing out a dirty copy of the location. Cache 18a will send a flush request down to bus 16a where cache 14b will relinquish exclusive access and send the modified copy of the memory location 15 back up the hierarchy. Depending on which write-deferred scheme is used, the data will either return first to main memory 22 or go directly to cache 18c and hence to cache 14h and processor 12h. The copies in cache 18a and cache 14b will remain, but will no longer be marked as exclusive.

In the multiprocessor system of the present invention, only those lower branches of the hierarchy that actually have copies of the affected memory location are involved in the coherency traffic. In the example discussed above, the processor and cache memory units associated with cache 18b do not see any invalidates or flushes and thus, there is no additional traffic load on bus 16b. As a result, cache coherency is maintained throughout the system without a significant increase in bus traffic, and lower level portions of the multiprocessor system are isolated from each other as much as possible. The combined effect of traffic isolation at the low levels through multiple buses, traffic reduction at the higher levels through hierarchical caches, and limitation of coherency control to those sections where it is necessary results in a large multiplication of bandwidth with full shared memory and automatic coherency control. While the use of write-through caches would result in bus saturation at the higher levels, the use of write-deferred caches would allow an almost unlimited expansion of the system by adding layers to the hierarchy.

The portion of the multiprocessor system shown in FIGS. 5 and 6 which include cache 18a, bus 16a, private caches 14a, 14b, 14c and processors 12a, 12b, 12c is referred to as a "cluster". Such clusters are actually independent multiprocessor computer systems in which the cache memory 18 is actually the main system memory. The hierarchical caching system of the present invention enables the joining of several such clusters into a larger multiprocessor computer system which includes a main central memory 22 which includes a copy of all data in the caches 18. Since cache coherency is maintained between the caches 18, data can be transferred between the various clusters.

Figure 7:
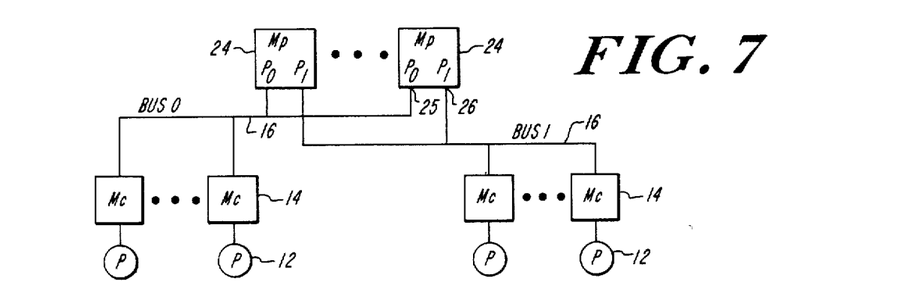
FIG. 7 is a diagramatic view of a two-port memory based multiprocessor system.

The hierarchical caching system of the present invention can also be utilized with multiported memories which can have several shared buses feeding into them. As shown in FIG. 7, multiported memories can be used by adding a couple of bits to each block in the memories to keep track of access patterns and determine the need for broadcasting invalidates or flushes to the associated shared buses 16.

Figure 8:
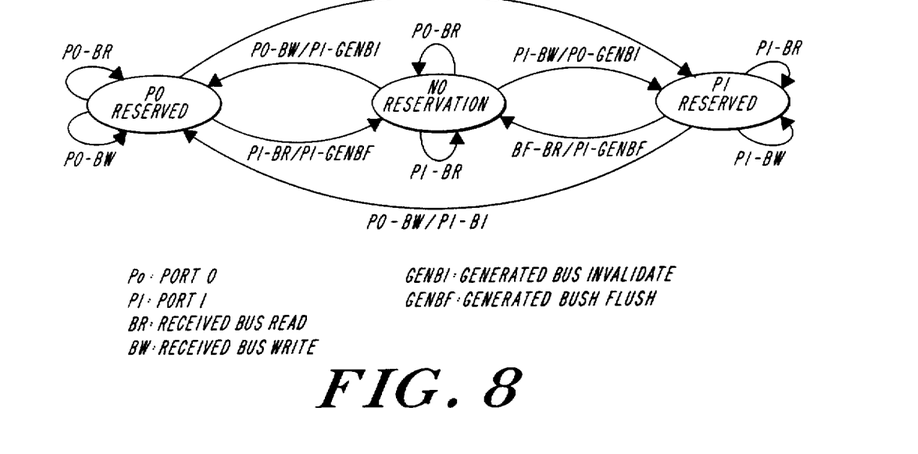
FIG. 8 is a state diagram for a two-port memory system utilizing a multicache coherency scheme according to the present invention.

The multiport memory 24 may be managed in a number of ways depending on whether write-through or write-deferred caching is used. Both types of caching make use of the fact that the amount of actively shared data in most multiprocessor systems is very small, and hence, some inefficiency in the shared case can be tolerated. The simplest scheme involves keeping track of which port 25, 26, if any, has exclusive access to a memory location ensuring that appropriate invalidate or flush requests are sent out whenever port status changes. As shown in the state diagram of FIG. 8, this may be accomplished by providing a state for each port indicating that it was the last port to receive a write access and that no reads from other ports have occurred since. An additional state is entered when there have been reads from several ports since the last write, indicating that there are copies of the location in several clusters. These states allow both write-through and write-deferred multicache coherency schemes to be extended across multiple ports.

The operation of the two port memories is similar for both write-through and write-deferred schemes. If a right access is received on a port already placed in the reserved state, then invalidates will be sent to all other ports, since they might have a copy of the location. The memory location is then reserved for that port by granting the port exclusive access. Further reads and writes from the reserve port will produce no additional invalidations (and hence, no additional bus traffic), but accesses from other ports will remove the exclusive access grant from the original port. Since invalidation requests are only sent out when writes occur to non-reserved ports, the normal case where memory locations are not shared across clusters or are shared in read only fashion, will generate no additional invalidations. Invalidation requests will only occur for those few locations actively shared and modified between both buses, thus resulting in very little bus traffic overhead. For the write-deferred schemes, flush requests will have to be sent to clusters which lose their exclusive access status due to a read access from another port. This will ensure that the read request will receive the most recent copy of the memory location. In the event that a flush request is necessary, the read access which precipitated it will not complete until the flush request has been satisfied.

Figure 9:
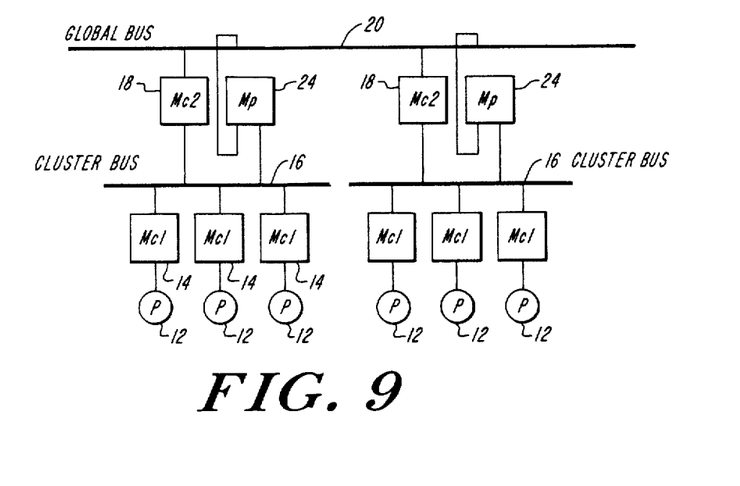
FIG. 9 is a diagramatic view of a multiprocessor utilizing multi-port memories and a hierarchical caching system of the present invention.

The hierarchical cashing system of the present invention can be connected at the bottom level with two port memories to form a structure with hierarchical interconnections and physically distributed main memory as shown in FIG. 9. Remote requests for a local memory may be routed through the local shared bus using a special adaptor board to provide the multiport coherency control while using standard single port memories. In such a cluster system, each bottom level bus forms a complete multiprocessor cluster with direct access to a bank of cluster local memory.

Figure 10:
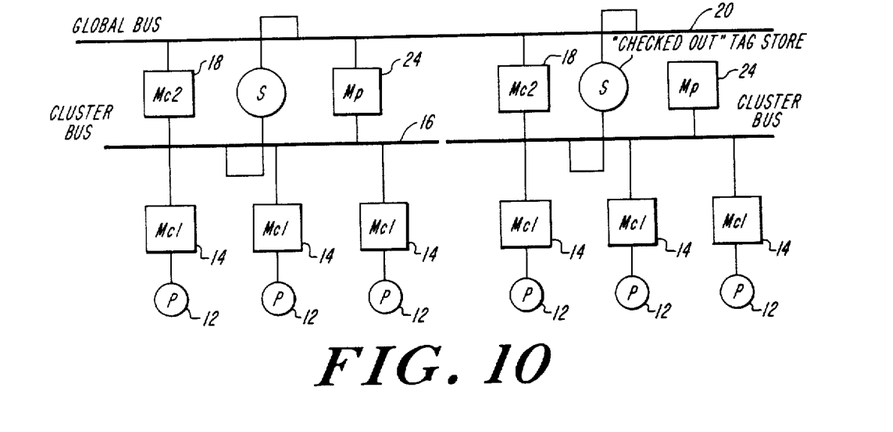
FIG. 10 is a diagramatic view of an alternate embodiment of the multiprocessor system shown in FIG. 5.
Figure 11:
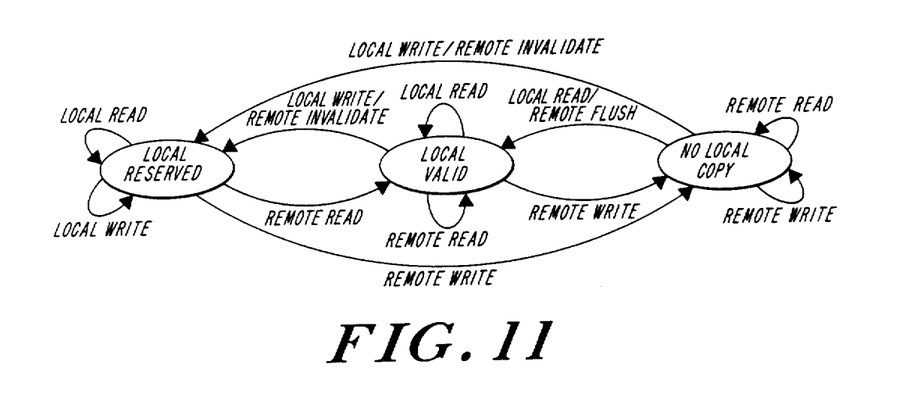
FIG. 11 is a statediagram of a cluster adapter using a multicache coherency scheme according to the present invention.

Referring now to FIG. 10, access to data stored in remote clusters proceed in a fashion similar to that of a straight hierarchical cache system. The cluster caches form the second level of caches and provide the same filtering and coherency control for remote references as the second level caches of the hierarchical scheme shown in FIGS. 3, 5–6. After reaching the top or global level of the hierarchy, the requests will be routed down to the cluster which contains the desired memory location, and will pass through that cluster's shared bus. Since the private caches on the cluster bus will also see this access, no special multiport coherency actions are necessary as would be required if the local memory were implemented as a true multiport memory. For those accesses which go directly to memory in the same cluster as the originating processor, additional coherency control is required along the same line as for the two port memories. This coherency control is performed using a special adapter card to keep track of possible remote copies, and for write-deferred caches whether a remote copy has exclusive access or not. In such a situation, if a local write is received, and the adapter card (see FIG. 11 for adapter card states) determines that a remote copy might exist, then an invalidate request is sent up the hierarchy to perform the function that the write request would perform in a pure hierarchy. If a local read is detected for a location for which the existence of a remote exclusive use copy is recorded, then a flush request must propagate up the hierarchy. With these extensions, the cache coherency scheme developed for hierarchical structures can be used to provide intercluster coherency as well.

There are several advantages to the cluster architecture. For example, it allows code and stacks to be kept local to a given cluster, thus leaving the higher levels of the system for global traffic. As a result, the cluster architecture allows even moderately large multiprocessors to use the simpler write-through caching scheme. Each process can be run on any of the local cluster's processors with equal ease thereby gaining most of the automatic load balancing advantages of a tightly coupled multiprocessor. These processes, however, can also be executed on a remote cluster when necessary. Because of the local cache memories, even a process running from a remote cluster will achieve close to maximum performance. Without the localization, however, intercluster bus traffic will be increased especially when write-through caches are employed.

The cluster architecture can also help with the management of global-shared accesses as well. The iterative nature of many scientific algorithms causes the global accesses to exhibit poor cache behavior. However, because the access patterns are highly predictable, it is often the case that globals can be partitioned to place them in the clusters where the greatest frequency of use will take place. In other cases, the global data may have to move between several clusters. Block transfer hardware can be provided to accomplish this motion before data is needed at the remote cluster. Thus the cluster architecture can take advantage of large grain locality to overcome the poor cache behavior of the global data resulting in shorter access latencies and less global bus traffic than a straight hierarchical cache scheme.

While the foregoing invention has been described with reference to its preferred embodiments, various modifications and alterations will occur to those skilled in the art. For example, while the invention has been described as including two levels of caches (the private caches and the caches positioned between the private caches and main memory), any number of levels of caches may be positioned between the private cache and main memory as long as each higher level cache has enough memory to include a copy of each memory location of the caches in the level immediately below to which it is connected. In addition, other deferred-write schemes may be used to maintain cache coherency. These and other such variations and modifications are intended to fall within the scope of the appended claims.

What is claimed is:

1. A method of maintaining cache coherency in a hierarchical cache memory system designed for use with a multiprocessor computer system including a plurality of processors, each having an associated private cache memory, and a central memory, said method comprising the steps of:

providing a shared cache memory connected to said private cache memories through a first bus shared by at least two of said processors and to said central memory through a second global bus;

when a processor performs a write operation to a memory location of its associated private cache memory thereby changing the contents of that memory location, copying the contents of said memory location into said shared cache memory connected to said first bus and into said central memory connected to said second global bus;

invalidating cache memory locations of cache memories, other than the private cache memory to which the write operation is performed and the cache memory into which the location was copied, which contain a copy of the written-to memory location;

placing said private cache memory location to which the write operation is performed in a reserved state indicating that the private cache containing said reserved memory location is the only private cache with a valid copy of said memory location;

enabling said processor, having an associated private cache memory means with a memory location in a reserved state, to perform additional write operations only to said associated private cache memory means, said shared cache memory means and said central memory retaining the contents of said reserved memory location as it existed prior to said additional write operations.

2. The method of maintaining cache coherency in a hierarchical cache memory system of claim 1 further comprising the steps of:

enabling a shared cache memory means to recognize a memory location in a reserved state in a private cache memory means connected to said recognizing cache memory means through a bus to which both said private and shared cache memory means are connected;

allowing said shared cache memory means recognizing said memory location in said reserved state to fetch the contents of said memory location in said reserved state.

3. An hierarchical cache memory system for use with a multiprocessor computer system including a plurality of processors and a central memory, said cache memory system comprising:

at least two groups of first level cache memory means, each of said first level cache memory means being associated with only one of the plurality of processors, all memory locations of said first level cache memory being writable;

first bus means associated with each of said at least two groups of first level cache memory means for connecting only said first level cache memory means in a group with each other;

one unique second level cache memory means connected to each of said first bus means, each of said second level cache memory means containing a copy of the contents of each memory location of all of the first level cache memory means connected to its first bus means;

second bus means connected to all of said second level cache memory means and to said central memory, said central memory containing a copy of the contents of each memory locations of all of said second level cache memory means;

means for writing the contents of a memory location of a first level cache memory means into a corresponding memory location of the second level cache memory means connected to its first bus means and into a corresponding memory location of said central memory each time a write operation changing the contents of a memory location is performed to a memory location of a first level cache memory means; and means for invalidating the contents of a memory location of a first level cache memory means or of a second level cache memory means corresponding to a location of another first level cache memory means to which a write operation changing the contents of the memory location has been performed.

4. The hierarchical cache memory system of claim 3 further comprising:

means for placing a first level cache memory means location in a reserved state when the processor associated with the first level cache memory means performs a write operation to said first level cache memory location, said reserved state indicating that the first level cache containing said memory location in a reserved state is the ony first level cache with a valid copy of said memory location.

5. The hierarchical cache memory system of claim 4 further comprising:

means for invalidating the contents of each memory location of first level cache memory means and of second level cache memory means which include a memory location corresponding to a memory location in a reserved state.

6. The hierarchical cache memory system of claim 5 further comprising means for enabling said processor, having an associated first level cache memory means with a memory location in a reserved state, to perform additional write operations only to said associated first level cache memory means, its associated second level cache memory means and said central memory retaining the contents of said reserved memory location as it existed prior to said additional write operations.

7. The hierarchical cache memory system of claim 4 further comprising:

means for enabling a second level cache memory means to recognize a memory location in a reserved state in one of its associated first level cache memory means through said first bus means.

8. The hierarchical cache memory system of claim 7 further comprising:

means for allowing said second level cache memory means recognizing said memory location in said reserved state to fetch the contents of said memory location in said reserved state.

9. A multiprocessor system comprising:

first multiprocessor system including at least one processor means, each of said at least one processor means being connected to an associated private cache memory means for storing frequently accessed memory locations, each of said at least one private cache memory means being connected to the others of said at least one private cache memory means through a first common bus means;

first shared cache memory means connected to said first common bus means, said first shared cache memory means including a copy of the contents of each memory location of each of said private cache memory means connected to said first common bus means;

second multiprocessor system including at least one processor means, each of said at least one processor means being connected to an associated private cache memory means for storing frequently accessed memory locations, each of said at least one private cache memory means being connected to the others of said at least one private cache memory means of said second multiprocessor system through a second common bus means;

second shared cache memory means connected to said second common bus means, said second cache memory means including a copy of the contents of each memory location of each of said private cache memory means connected to said second common bus means;

central memory means connected to a global bus means to which said first and second cache memory means are also connected, said central memory means including a copy of the contents of each memory location of said first and second shared cache memory means;

means for writing the contents of a memory location of a private cache memory means into a corresponding memory location of said first or second shared cache memory means and into a corresponding memory location of said central memory means each time a write operation changing the contents of a memory location is performed to a memory location of a cache memory means; and means for invalidating the contents of a memory location of a private cache memory means or of said first or second shared cache memory means which include a memory location corresponding to a location of another private cache means to which a write operation has been performed.

10. A multiprocessor system comprising:

first multiprocessor system including at least one processor means, each of said at least one processor means being connected to an associated private cache memory means for storing frequently accessed memory locations, each of said at least one private cache memory means being connected to the others of said at least one private cache memory means through a first common bus means;

first shared cache memory means connected to said first common bus means, said first shared cache memory means including a copy of the contents of each memory location of each of said private cache memory means connected to said first common bus means;

second multiprocessor system including at least one processor means, each of said at least one processor means being connected to an associated private cache memory means for storing frequently accessed memory locations, each of said at least one private cache memory means being connected to the others of said at least one private cache memory means of said second multiprocessor system through a second common bus means;

second shared cache memory means connected to said second common bus means, said second cache memory means including a copy of the contents of each memory location of each of said private cache memory means connected to said second common bus means;

central memory means connected to a global bus means to which said first and second cache memory means are also connected, said central memory means including a copy of the contents of each memory location of said first and second shared cache memory means; and means for placing a private cache memory location in a reserved state when the processor associated with the private cache performs a write operation to said memory location thereby changing the contents of the memory locations, said reserved state indicating that the private cache containing said reserved memory location is the only private cache with a valid copy of said memory location.

11. The multiprocessor system of claim 10 further comprising:

means for invalidating the contents of each memory location of a private cache memory means or of said first or second shared cache memory means which includes a memory location corresponding to a memory location in a reserved state.

12. The multiprocessor system of claim 11 further comprising:

means for enabling said processor, having an associated private cache memory means with a memory location in a reserved state to perform additional write operations only to said associated private cache memory means, its associated shared cache memory means and said central memory means retaining the contents of said reserved memory location as it existed prior to said additional write operations.

13. The multiprocessor system of claim 10 further comprising:

means for enabling a shared cache memory means to recognize a memory location in a reserved state in a private cache memory means through its associated common bus means.

14. The multiprocessor system of claim 13 further comprising:

means for allowing said shared cache memory means recognizing said memory location in said reserved state to fetch the contents of said memory location in said reserved state.

* * * * *